(12) United States Patent
Hemphill et al.

(10) Patent No.: US 9,976,226 B2
(45) Date of Patent: May 22, 2018

(54) METHOD OF STRESSING OXIDES

(71) Applicant: Pacesetter, Inc., San Jose, CA (US)

(72) Inventors: Ralph Jason Hemphill, Sunset, SC (US); David R. Bowen, Taylors, SC (US); James Brian Smith, Pickens, SC (US); Thomas F. Strange, Easley, SC (US)

(73) Assignee: PACESETTER, INC., Sunnyvale, CA (US)

( * ) Notice: Subject to any disclaimer, the term of this patent is extended or adjusted under 35 U.S.C. 154(b) by 162 days.

(21) Appl. No.: 15/221,896

(22) Filed: Jul. 28, 2016

(65) Prior Publication Data
US 2018/0030610 A1 Feb. 1, 2018

(51) Int. Cl.
| | |
|---|---|
| *C25D 11/18* | (2006.01) |
| *C25D 11/16* | (2006.01) |
| *C25D 11/04* | (2006.01) |
| *H01G 9/055* | (2006.01) |
| *C25F 3/04* | (2006.01) |
| *H01M 4/66* | (2006.01) |
| *H01M 4/02* | (2006.01) |

(52) U.S. Cl.
CPC ............ *C25D 11/18* (2013.01); *C25D 11/04* (2013.01); *C25D 11/16* (2013.01); *C25F 3/04* (2013.01); *H01G 9/055* (2013.01); *H01M 4/661* (2013.01); *H01M 2004/027* (2013.01)

(58) Field of Classification Search
CPC .................................................. C25D 11/18
USPC ................... 205/229, 223, 210, 213, 324
See application file for complete search history.

(56) References Cited

U.S. PATENT DOCUMENTS

| | | |
|---|---|---|
| 4,474,657 A | 10/1984 | Arora |
| 4,518,471 A | 5/1985 | Arora |
| 4,525,249 A | 6/1985 | Arora |
| 5,131,388 A | 7/1992 | Pless et al. |
| 5,382,347 A * | 1/1995 | Yahalom ............... C25D 11/12 205/171 |
| 5,715,133 A | 2/1998 | Harrington et al. |
| 6,802,954 B1 | 10/2004 | Hemphill et al. |
| 6,858,126 B1 | 2/2005 | Hemphill et al. |
| 8,535,507 B1 | 9/2013 | Hemphill et al. |

OTHER PUBLICATIONS

U.S. Appl. No. 14/849,064, filed Sep. 9, 2015, entitled "Sonicating Bath for Anode Foils".

* cited by examiner

*Primary Examiner* — Brian W Cohen

(57) ABSTRACT

Methods are presented that includes replacing oven depolarization of a foil with a sonic vibration process for stressing the oxide. The method includes electrochemically etching the metal foil to form a plurality of tunnels in the metal foil and forming an oxide on a surface of the metal foil. The method further includes applying sonic vibration to the metal foil to induce stress fractures in the oxide, and reforming the oxide to heal at least a portion of the stress fractures.

20 Claims, 5 Drawing Sheets

METHOD OF STRESSING OXIDES

FIELD

The present invention relates generally to methods of forming and reforming anode foils for use in aluminum electrolytic capacitors or batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

ICDs, such as those disclosed in U.S. Pat. No. 5,131,388, incorporated herein by reference, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them, all placed within the capacitor case.

In order to obtain higher capacitance, tunnels are often etched through the thickness of the anode metal foils. The energy density in an aluminum electrolytic capacitor is directly related to the surface area of the anodes generated in the electrochemical etching processes. Typical surface area increases are 40 to 1 and represent 30 to 40 million tunnels/cm$^2$. An electrochemical widening step is used to increase the tunnel diameter after etching to insure the formation oxide will not close off the tunnels.

Next, the high surface area foil is put through a formation process known by those skilled in the art to grow a voltage supporting oxide with low leakage current and low deformation properties. Under conventional techniques, a barrier oxide layer is formed onto one or both surfaces of the metal foil by placing the foil into an electrolyte bath and applying a positive voltage to the metal foil and a negative voltage to the electrolyte. This formation process (also referred to as anodization or electrolysis) oxidizes the surface of the metal foil.

An oven depolarization process is then applied after formation to drive off any water that may have formed during oxide formation and induce stress cracking to expose weak areas. However, the use of depolarization ovens has a negative effect on the foil capacitance after each depolarization step due to oxide growth in the oven and/or oxide conversion.

BRIEF SUMMARY

An improved approach to stressing and cracking the oxide at weak points is presented herein. An example method is presented that includes replacing the oven depolarization process with a sonic vibration process for stressing the oxide.

According to an embodiment, a method of stressing the oxide includes etching a foil to create tunnels on the surface of the foil, which increase the surface area of the foil. Next, the high surface area foil is put through a formation process known by those skilled in the art to grow a voltage supporting oxide with low leakage current and low deformation properties. At this point, the oxide needs to be stressed to identify weak areas. The foil is exposed to sonic vibration with frequencies in the range of 20 Hz to 20,000 Hz. In one configuration, the foil is placed in a tank filled with deionized water at room temperature and energy from the vibrations allows for the cracking of the oxide. Ultrasonic vibration may be applicable at smaller doses to create the same effect. After stress fractures appear on the oxide, the oxide is reformed to heal those stress fractures. This reformation process may be the same as the initial oxide formation process, as described above.

By completely replacing oven depolarization with sonic vibration, the foil capacitance may be increased by 7% to 8%, but the leakage current may also increase by over 30%. This leakage current may be reduced by using both oven depolarization and sonic vibration.

According to an embodiment, after the foil is etched and the oxide is formed during a first pass, the foil is exposed to oven depolarization to induce initial stress fractures. Next, the oxide is reformed as described above. Then, the foil is to be stressed again to further identify weak areas. However, rather than using oven depolarization as was used during the first pass at inducing the stress fractures, the sonic vibration technique is used, as described above. The oxide is then reformed again to heal any additional stress fractures that appeared. Then, the sonic vibration and the reformation may be applied additional times for a 3$^{rd}$ pass, a 4$^{th}$ pass, and so on.

In the aforementioned embodiment, the foil capacitance is increased by 5% to 6%, but the leakage current only goes up by 10% to 15%. Additionally, the deformation is reduced by over 70%.

Further embodiments, features, and advantages of the present apparatus and method, as well as the structure and operation of the various embodiments of the present apparatus and method, are described in detail below with reference to the accompanying drawings.

BRIEF DESCRIPTION OF THE DRAWINGS/FIGURES

The accompanying drawings, which are incorporated herein and form part of the specification, illustrate the methods and systems presented herein for processing an anode metal foil. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number.

DETAILED DESCRIPTION

The following detailed description of methods and systems for processing metal anode foils refers to the accompanying drawings that illustrate exemplary embodiments consistent with these methods and systems. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

It would be apparent to one of skill in the art that the methods and systems for processing metal anode foils, as described below, may be implemented in many different embodiments without departing from the scope of the description below. Thus, the operation and behavior of the methods and systems will be described with the understanding that modifications and variations of the embodiments are possible, given the level of detail presented herein. It will be apparent to a person skilled in the relevant art that the methods and systems also be employed to produce porous anode foils for use in a variety of devices and applications in addition to use in an ICD.

Figure 1:
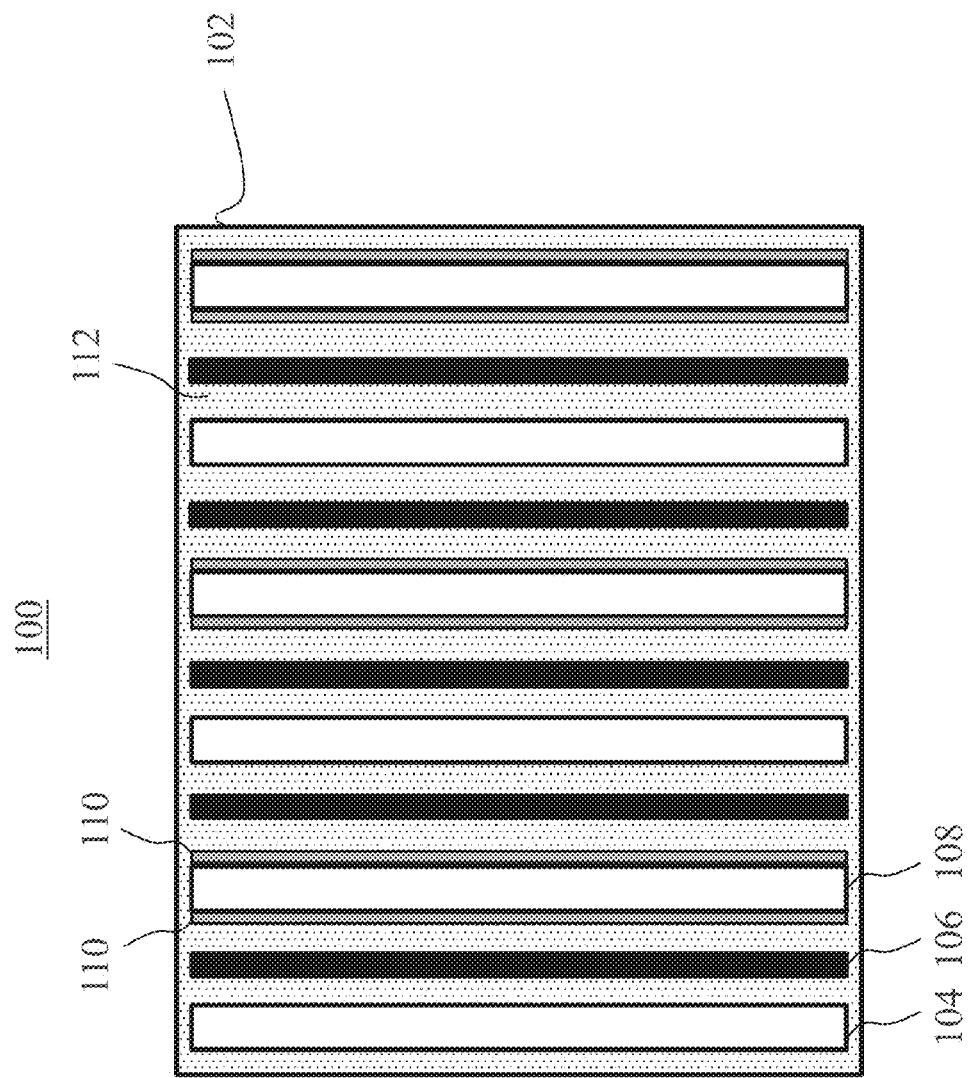
FIG. 1 illustrates a cross-section of an electrolytic capacitor or battery.

FIG. 1 illustrates a cross-sectional view of an electronic component 100. Electronic component 100 includes a housing 102 that contains a plurality of cathodes 104 alternating with a plurality of anodes 108, and separated by a plurality of separators 106. Each anode 108 includes a dielectric material 110 on or around an outer surface of anode 108. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, and the plurality of anodes 108 may be similarly connected to a single, common anode terminal.

Electronic component 100 may be, for example, an electrolytic capacitor or a battery. When electronic component 100 is used as a capacitor, example materials for the plurality of cathodes 104 include aluminum, titanium, stainless steel, while example materials for the plurality of anodes 108 include aluminum and tantalum. When electronic component 100 is used as a battery, example materials for the plurality of cathodes 104 include silver vanadium oxide, carbon fluoride, magnesium oxide, or any combination thereof, while example materials for the plurality of anodes 108 include lithium metal.

Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108.

It should be understood that the various elements and dimensions of electronic component 100 are not drawn to scale. Although each of capacitor 104, separator 106, and anode 108 are illustrated as being spaced apart from one another for the convenience of illustration and labeling, it would be understood by one skilled in the art that such elements may also be stacked together in close physical contact with one another.

A given anode 108 as illustrated in FIG. 1 may represent a stack of anode layers. For example, anode 108 may represent a stack of around five metal foils, each having a thickness between about five microns and 40 microns. Each metal foil also includes a plurality of tunnels through the thickness of the foil to increase the surface area of the anode exposed to electrolyte 112. Similarly, a given cathode 104 may represent a stack of cathode layers.

Figure 2:
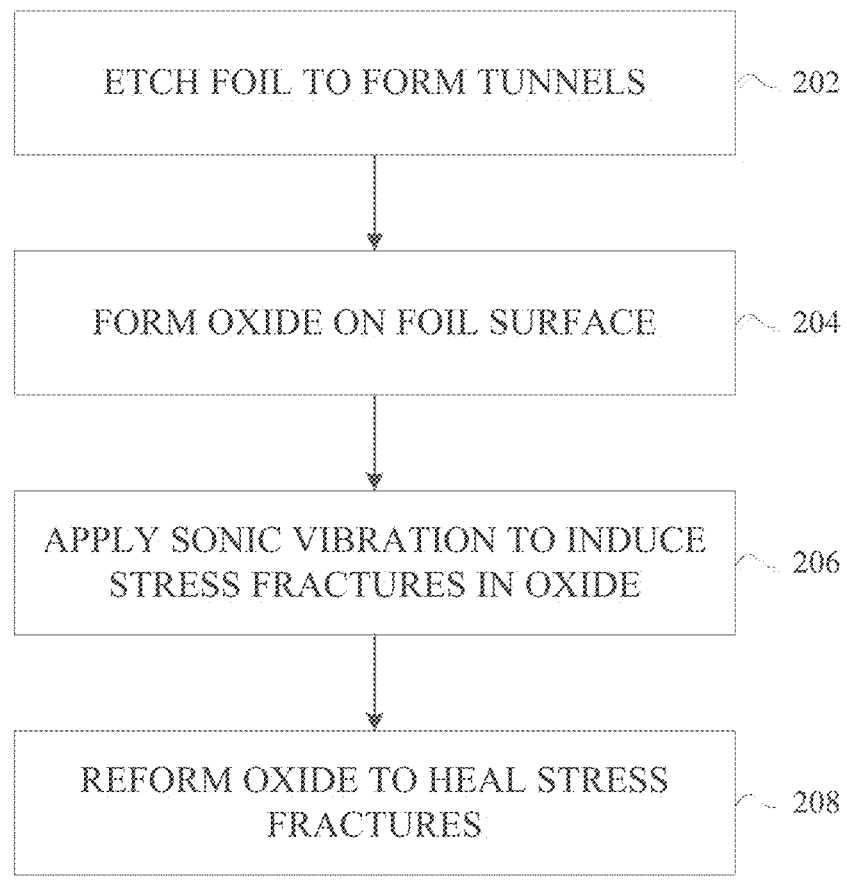
FIG. 2 illustrates a flow chart of a method of stressing oxides in a metal foil, according to an embodiment.

FIG. 2 illustrates an example method 200 of processing metal foils. In one example, the metal foil is an aluminum foil that is used as the anode within a capacitor or battery.

At step 202, the metal foil is etched to form a plurality of tunnels on the surface of the metal foil. A conventional etch process, as known to those skilled in the relevant art, produces an enlargement of the surface area of the foil. Surface area of the foil is increased by electrochemically removing portions of the foil to create etched tunnels, as disclosed in U.S. Pat. Nos. 4,474,657, 4,518,471, 4,525,249 and 5,715,133, the disclosures of which are incorporated herein by reference. Since the capacitance of an electrolytic capacitor increases with the surface area of its electrodes, increasing the surface area of the anode foil results in increased capacitance per unit volume of the electrolytic capacitor. By electrochemically etching the foil, an enlargement of a surface area of the foil will occur. Electrolytic capacitors which are manufactured with such etched foils can obtain a given capacity with a smaller volume than an electrolytic capacitor which utilizes a foil with an unetched surface.

In an embodiment, the tunnels may be also be electrochemically widened after formation to increase the diameters of the tunnels, thereby further increasing the surface area of the foil. The widening may also help prevent clogging during a later oxide formation step. Both the etching and widening processes can remove as much as 50% to 60% of the foil to create greater than 30 million tunnels per cm$^2$.

At step 204, an oxide is formed on the surface of the metal foil. In the case of an aluminum foil, a layer of aluminum oxide is formed over the surface of the aluminum foil. Examples of the oxidization process may be found in U.S. Pat. Nos. 6,858,126, 6,802,954, or 8,535,507.

At step 206, the metal foil is subjected to sonic vibration to induce stress fractures in the oxide. In an embodiment, the foil is exposed to sonic frequencies in the audible range of 20 Hz to 20,000 Hz for 2 to 6 minutes. In an embodiment, the foil is subjected to the sonic vibration for 4 minutes. In one configuration, the foil is placed in a tank filled with deionized water at room temperature and energy from the vibrations allows for the cracking of the oxide. An example configuration of the tank is described in commonly owned U.S. patent application Ser. No. 14/849,064, filed Sep. 9, 2015, entitled "Sonicating Bath for Anode Foils," the disclosure of which is incorporated herein by reference.

In another embodiment, ultrasonic vibration is used in smaller doses, where the foil is exposed to frequencies of greater than 20,000 Hz for between 2 and 6 minutes.

At step 208, the oxide is reformed to heal at least a portion of the stress fractures. In one example, the oxide is reformed at a voltage of about 435 Volts in a suitable forming solution, as discussed in U.S. Pat. No. 8,535,507. The oxide may be reformed at a high temperature between about 80 degrees Celsius and about 100 degrees Celsius, preferably at about 85 degrees Celsius.

In an embodiment, after the oxide formation step 204 is applied to the foil in a first tank of deionized water as described above, the sonic vibration step 206 is applied after placing the foil in a different tank system. The foil is then returned to the first tank for the reformation of the oxide in step 208.

In another embodiment, a single tank system is used for all 3 steps of oxide formation 204, sonic vibration 206, and reformation 208.

Figure 3:
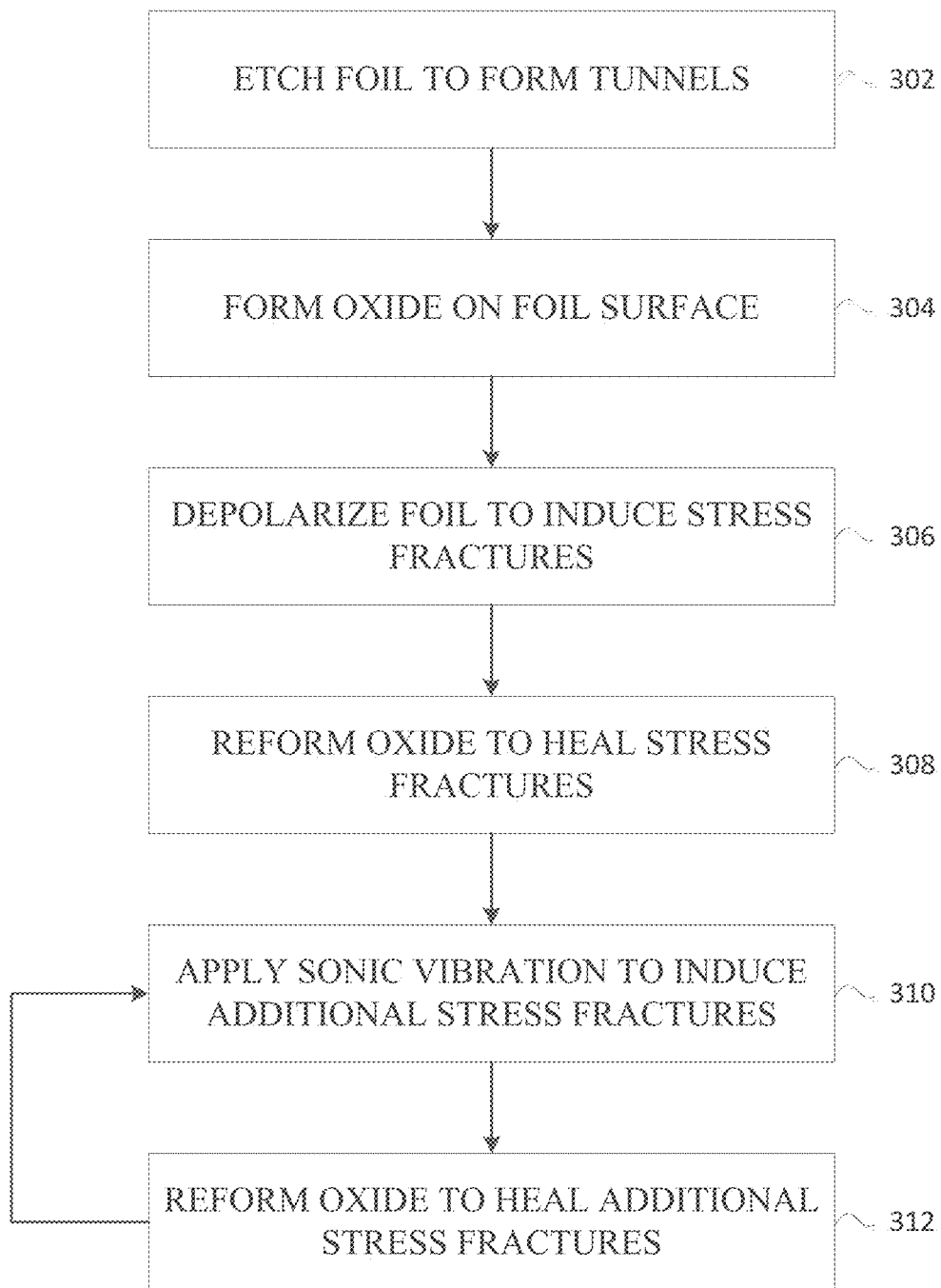
FIG. 3 illustrates a flow chart of another method of stressing oxides in a metal foil, according to an embodiment.

FIG. 3 illustrates an alternative method 300 of processing metal foils, according to another embodiment. In method 300, oven depolarization is used as the initial stress fracture inducing process on the first pass, followed by sonic vibration at the second and later passes, as described in more detail below.

In step 302, the metal foil is etched to form a plurality of tunnels on the surface of the metal foil, as described above in step 202 of method 200.

In an embodiment, the tunnels may be also electrochemically widened as described in method 200.

Next, in step 304, oxides are formed on the surface of the metal foil, as described above in step 204 of method 200.

At step 306, an initial stress fracture inducing process is applied to the foil. In this embodiment, oven depolarization is used to cause the stress fractures. In one example, the foil is placed in an oven and exposed to temperatures between about 400 degrees Celsius and about 600 degrees Celsius for anywhere between 1 and 6 minutes. In an embodiment, the foil is exposed to a temperature of 500 degrees Celsius for 4 minutes. The oven depolarization procedure drives off any water that may have formed during oxide formation, and stresses the surface of the oxide to expose weak areas in the oxide. The weak areas are evidenced by the presence of stress fractures.

In step 308, the oxide is reformed to heal at least a portion of the stress fractures, as described above in step 208 of method 200.

At step 310, a second stress fracture inducing process is applied to the foil. During this pass, however, the sonic vibration technique, as described in step 206 of method 200, is used instead of the oven depolarization process. The sonic vibration may induce additional stress fractures in the oxide that were not exposed during oven depolarization.

At step 312, the oxide is reformed to heal at least a portion of the additional stress fractures, similar to the reformation process as described in step 208 of method 200.

In an embodiment, it may be desirable to repeat the steps of 310 and 312, the benefits for which are discussed later with reference to FIG. 3.

In an embodiment, oxide formation step 304 and reformation step 308 are applied to the foil in a first tank of deionized water as described above. For the sonic vibration step 310, the foil is placed in a different tank system. The foil is then returned to the first tank for the oxide reformation in step 312.

In another embodiment, a single tank system is used for all steps of oxidation 304, first reformation 308, sonic vibration 310, and second reformation 312.

Figure 4:
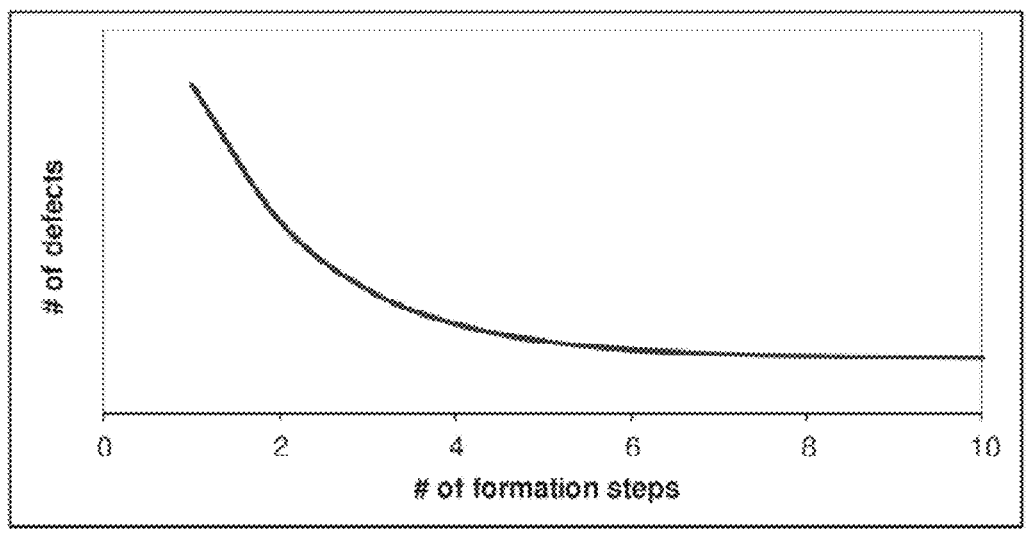
FIG. 4 is a graph of the number of defects in a metal foil based on the number of passes of oxide reformation.

FIG. 4 is a graph of the number of defects in a metal foil based on the number of passes of oxide reformation. As shown in the figure, the number of defects in the foil is greatest after the first oxide formation, and decreases as additional reformation steps are applied. After about the 4$^{th}$ reformation process, the benefit of reforming the oxide levels out (i.e., no further decrease in the number of defects) and additional reformation is typically not needed.

Figure 5:
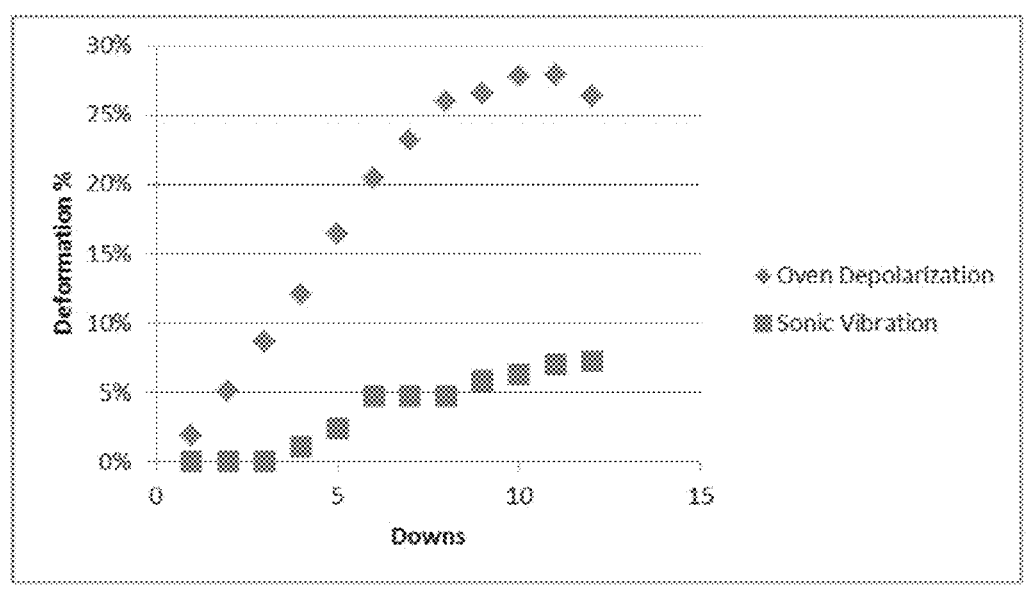
FIG. 5 is a graph showing deformation percentage of capacitors made with oven depolarized foils as compared to capacitors made with foils using the sonic vibration technique.

FIG. 5 is a graph showing deformation percentage capacitors made with oven depolarized foils as compared to capacitors made with foils using the sonic vibration technique. In an experiment, 64 sheets of foil from production after hydration were separated into odds and evens of foil number. The control group consisted of the even numbered foils, which were put through a 475 Volt EFV formation process using oven depolarization steps for 4 minutes each at 500 degrees Celsius. The odd numbered foils were put through a process where sonic vibration was substituted for most of the oven depolarization steps. For the odd numbered foils, only the second reformation used the oven treatment at 500 degrees Celsius for 4 minutes. All other reformation steps used a 4 minute sonic vibration treatment at 87 HZ. The foil capacitance average of the control group (even foils) was 283.2 microfarads and the sonicated group (odd foils) was 301.1 microfarads, representing a 5.9% increase in foil capacitance. The 2 groups of foils were built into single capacitors. Table 1 below shows capacitor test results between the 2 groups.

TABLE 1

| Group | Delivered Energy (J) | DSR | 5 min Leakage Current (microA) | Charge Efficiency (%) |
|---|---|---|---|---|
| Control | 17.30 | 0.865 | 224 | 66.78 |
| Sonic | 18.13 | 0.884 | 281 | 67.64 |

Next, capacitors from each group were put through deformation testing at 423 Volts, 0.008 A, and 25 ohms. Each down was after 22 hours at 90 degree Celsius. As shown in FIG. 5, the deformation is significantly improved for the capacitors made with foils that used sonic vibration. Deformation is the time to 423 Volts divided by the baseline charge time at down 0.

Figure 6A:
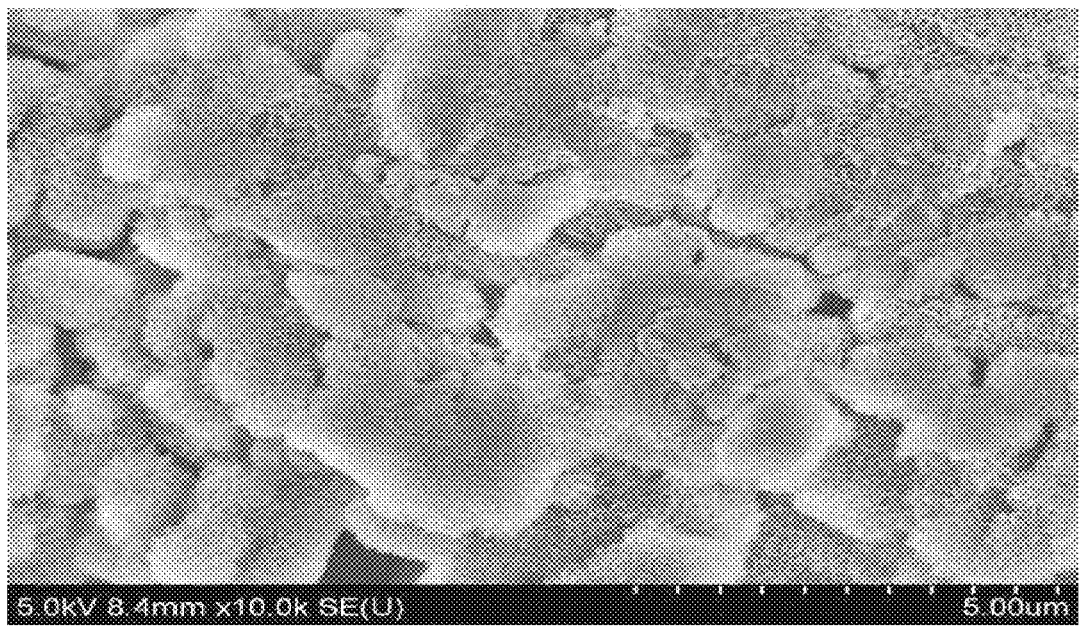
FIG. 6A shows an example scanning electron microscope (SEM) photograph of an oxide on a surface of a metal foil that has been treated with oven depolarization.
Figure 6B:
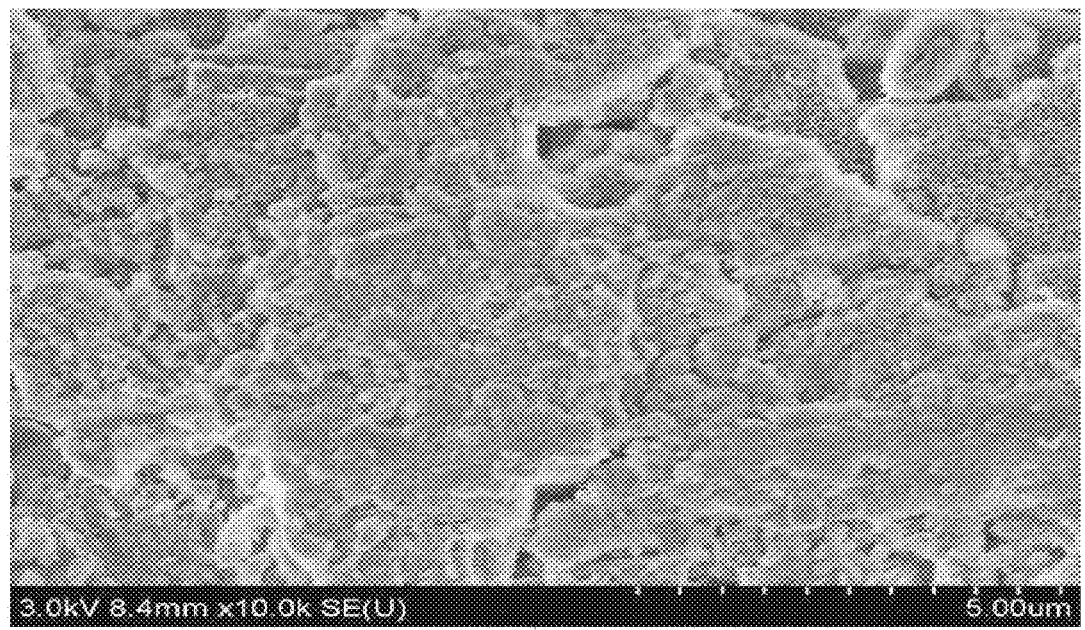
FIG. 6B shows an example SEM photograph of an oxide on a surface of a metal foil that has been treated with sonic vibration.

FIG. 6A shows an SEM photograph of an oxide on a surface of a metal foil that has been treated with oven depolarization. Similarly, FIG. 6B shows an SEM photograph of an oxide on a surface of a metal foil that has been treated with sonic vibration. As can be seen when comparing FIGS. 6A and 6B, there is a difference in the structure of the oxide when sonic vibration is used vs. when oven depolarization is used. The resulting oxide after sonic vibration has a more compact structure, which results in anode foils having a higher capacitance.

It is to be appreciated that the Detailed Description section, and not the Summary and Abstract sections, is intended to be used to interpret the claims. The Summary and Abstract sections may set forth one or more but not all exemplary embodiments of the present method and system as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

What is claimed is:

1. A method of processing a metal foil, comprising:
electrochemically etching the metal foil to form a plurality of tunnels in the metal foil;
forming an oxide on a surface of the metal foil;
applying sonic vibration to the metal foil to induce stress fractures in the oxide; and
reforming the oxide to heal at least a portion of the stress fractures.

2. The method of claim 1, wherein applying the sonic vibration comprises applying the sonic vibration for 2 to 6 minutes.

3. The method of claim 2, wherein applying the sonic vibration comprises exposing the metal foil to sonic frequencies of 20 Hz to 20,000 Hz.

4. The method of claim 2, wherein applying the sonic vibration comprises exposing the metal foil to sonic frequencies of greater than 20,000 Hz.

5. The method of claim 1, wherein:
forming the oxide comprises submerging the metal foil inside a first apparatus;
applying the sonic vibration comprises applying the sonic vibration while the metal foil is submerged inside a second apparatus; and
reforming the oxide comprises reforming the oxide after the metal is re-submerged inside the first apparatus.

6. The method of claim 1, wherein forming the oxide, applying the sonic vibration, and reforming the oxide are performed in a single apparatus.

7. The method of claim 1, further comprising:
electrochemically widening the plurality of tunnels to increase tunnel diameters of the plurality of tunnels.

8. The method of claim 1, wherein the applying and the reforming are repeated one or more times.

9. The method of claim 1, wherein the metal foil is used as an anode or cathode in an electrolytic capacitor.

10. A method of processing a metal foil, comprising:
electrochemically etching the metal foil to form a plurality of tunnels in the metal foil;
forming an oxide on a surface of the metal foil;
depolarizing the metal foil in an oven to induce stress fractures in the oxide;
reforming the oxide to heal at least a portion of the stress fractures;
applying sonic vibration to the metal foil to induce additional stress fractures in the oxide; and
reforming the oxide to heal at least a portion of the additional stress fractures.

11. The method of claim 10, wherein applying the sonic vibration comprises applying the sonic vibration for 2 to 6 minutes.

12. The method of claim 11, wherein applying the sonic vibration comprises exposing the metal foil to sonic frequencies of 20 Hz to 20,000 Hz.

13. The method of claim 10, wherein applying the sonic vibration comprises exposing the metal foil to sonic frequencies of greater than 20,000 Hz.

14. The method of claim 10, wherein:
forming the oxide comprises submerging the metal foil inside a first apparatus;
applying the sonic vibration comprises applying the sonic vibration while the metal foil is submerged inside a second apparatus; and
reforming the oxide comprises reforming the oxide after the metal is re-submerged inside the first apparatus.

15. The method of claim 10, wherein forming the oxide, applying the sonic vibration, and reforming the oxide are performed in a single apparatus.

16. The method of claim 10, further comprising:
electrochemically widening the plurality of tunnels to increase tunnel diameters of the plurality of tunnels.

17. The method of claim 10, wherein the depolarizing comprises exposing the metal foil to a temperature of 500 degrees Celsius for 4 minutes.

18. The method of claim 10, wherein the applying and the reforming are repeated one or more times.

19. The method of claim 10, wherein the metal foil is used as an anode or cathode in an electrolytic capacitor.

20. The method of claim 16, wherein electrochemically widening the plurality of tunnels increases the tunnel diameters to 30 million tunnels/cm$^2$.

* * * * *